(12) United States Patent
Polte et al.

(10) Patent No.: US 11,383,564 B2
(45) Date of Patent: Jul. 12, 2022

(54) COUPLING PLATE FOR A FIFTH WHEEL COUPLING

(71) Applicant: JOST-WERKE DEUTSCHLAND GMBH, Neu-Isenburg (DE)

(72) Inventors: Jens Polte, Greenville, TN (US); José Manuel Algüera, Aschaffenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 330 days.

(21) Appl. No.: 16/525,788

(22) Filed: Jul. 30, 2019

(65) Prior Publication Data

US 2020/0039305 A1 Feb. 6, 2020

(30) Foreign Application Priority Data

Aug. 1, 2018 (DE) ...................... 10 2018 118 656.8

(51) Int. Cl.
*B60D 1/01* (2006.01)
*B60D 1/36* (2006.01)

(52) U.S. Cl.
CPC ............... *B60D 1/015* (2013.01); *B60D 1/36* (2013.01)

(58) Field of Classification Search
CPC ...... B60D 1/015; B60D 1/36; B62D 53/0807; B62D 53/08
See application file for complete search history.

(56) References Cited

U.S. PATENT DOCUMENTS

| 5,765,849 | A | 6/1998 | Moulton et al. | |
|---|---|---|---|---|
| 7,198,282 | B2 * | 4/2007 | Burchett | B62D 53/08 |
| | | | | 280/433 |
| 7,694,992 | B1 * | 4/2010 | Mann | B62D 53/0871 |
| | | | | 280/438.1 |
| 9,067,629 | B2 * | 6/2015 | Van Der Knaap | B62D 21/02 |
| 10,300,961 | B2 | 5/2019 | Alguera Gallego et al. | |
| 2003/0047906 | A1 | 3/2003 | Hicks et al. | |

FOREIGN PATENT DOCUMENTS

| EP | 1697206 B1 | 3/2008 |
|---|---|---|
| EP | 2247492 B1 | 4/2012 |
| WO | 2009092756 A1 | 7/2009 |
| WO | 2018217848 A1 | 11/2018 |

* cited by examiner

*Primary Examiner* — Jacob D Knutson
*Assistant Examiner* — Marlon A Arce
(74) *Attorney, Agent, or Firm* — Hudak, Shunk & Farine Co. LPA

(57) ABSTRACT

A coupling plate for a fifth wheel coupling, wherein the coupling plate on a top side includes a planar bearing surface and at a rear end it includes two entrance horns bordering on an entrance opening, the entrance opening extends in a longitudinal axis (x) of the coupling plate and ends in a kingpin bearing region, and the coupling plate is configured with a respective receiving structure for a bearing block on its bottom side, on either side of the kingpin bearing region and spaced apart from each other on a transverse axis (y). The problem which the invention proposes to solve is to provide a standardized coupling plate, having a minimal natural weight, given a slight loading, and whose strength can be adapted for higher anticipated loads. The problem is solved according to the invention in that at least one connection means for the releasable mounting of at least one stiffening element is formed on the coupling plate beneath the planar bearing surface.

18 Claims, 5 Drawing Sheets

COUPLING PLATE FOR A FIFTH WHEEL COUPLING

FIELD OF THE INVENTION

The invention relates to a coupling plate for a fifth wheel coupling, wherein the coupling plate on a top side comprises a planar bearing surface and at a rear end it comprises two entrance horns bordering on an entrance opening, the entrance opening extends in a longitudinal axis (x) of the coupling plate and ends in a kingpin bearing region, and the coupling plate is configured with a respective receiving structure for a bearing block on its bottom side, on either side of the kingpin bearing region and spaced apart from each other on a transverse axis (y). Furthermore, the invention is also protected in combination with a stiffening element.

BACKGROUND OF THE INVENTION

By means of a fifth wheel coupling, a semitrailer is usually coupled releasably to a tractor vehicle. The fifth wheel coupling for this purpose is secured on the tractor vehicle and comprises, besides a coupling plate, also a closure mechanism, by means of which a kingpin arranged in fixed manner on the semitrailer can be secured in the fifth wheel coupling. Furthermore, the fifth wheel coupling comprises two bearing blocks, by which the coupling plate is braced on the tractor vehicle and enabling a swivel ability of the coupling plate about a horizontal swivel axis. The bearing blocks engage either directly with a vehicle frame of the tractor vehicle at the tractor vehicle side or they are mounted by means of an auxiliary intermediate frame on the vehicle frame. It may also be provided that the bearing blocks stand on a mounting plate, which connects the two beams of the vehicle frame. The coupling plate is subjected to enormous stresses during driving operation and is usually made of a massive steel structure, whose weight should be reduced however, or else a correspondingly lower weight will be available for the goods being transported. Furthermore, a large empty weight of the vehicle causes a high fuel consumption, unfavorable pollution emission values, and worse driving performance. Manufacturers try to meet the need for the most lightweight possible coupling plate by providing a weight-optimized coupling plate for the particular load scenario.

US 2003/0047906 A1 discloses a weight-reduced fifth wheel coupling with a coupling plate made of steel or aluminum, being formed on its bottom side with a rib structure to increase the strength. This coupling plate is also designed for a specific loading scenario, so that the manufacturer must design, produce, and logistically manage reasonable quantities of differently dimensioned coupling plates for different loading scenarios.

EP 1 697 206 B1 discloses a fifth wheel coupling with a single-piece coupling plate as well as bearing blocks, which can be connected to the coupling plate. The bearing blocks can be fastened to a tractor machine. The coupling plate is made from an aluminum alloy. Moreover, a method is proposed for making a coupling plate.

SUMMARY OF THE INVENTION

The problem which the invention proposes to solve is to provide a standardized coupling plate, having a minimal natural weight, given a slight loading, and whose strength can be adapted for higher anticipated loads.

The problem is solved according to the invention with the features of a coupling plate for a fifth wheel coupling, wherein the coupling plate on a top side comprises a planar bearing surface and at a rear end it comprises two entrance horns bordering on an entrance opening, the entrance opening extends in a longitudinal axis (x) of the coupling plate and ends in a kingpin bearing region, and the coupling plate is configured with a respective receiving structure for a bearing block on its bottom side, on either side of the kingpin bearing region and spaced apart from each other on a transverse axis (y), wherein at least one connection means for the releasable mounting of at least one stiffening element is formed on the coupling plate beneath the planar bearing surface. Typically, the coupling plate is a steel component made by casting or welding as a single piece and not further broken down without destroying it. Furthermore, however, the coupling plate may be formed of multiple segments which are spaced apart from each other and whose top sides together subtend a planar bearing surface to support a skid plate. Such a coupling plate can also be fabricated at least partly from a plastic.

The operating forces are transmitted from the kingpin and the skid plate of the semitrailer to the coupling plate and from there across the bearing blocks to the tractor vehicle. In particular when driving on curves, lift forces act in lateral regions of the coupling plate, which are absorbed by the bearing blocks. The at least one connection means for the releasable mounting of at least one stiffening element therefore likewise extends at least for a portion in an axis parallel to the transverse axis of the coupling plate, in order to accomplish a stiffening of the coupling plate in the transverse axis after installing one or more stiffening elements. In the case of slight anticipated operating loads, the coupling plate can be used in a simple configuration without stiffening elements and have a minimal natural weight. For scenarios with large anticipated operating loads, it is possible to mount at least one stiffening element on the coupling plate and thereby increase the bending stiffness in the transverse axis. However, with the mounting of the at least one stiffening element on the coupling plate the natural weight of the coupling plate is also increased by the weight of the at least one stiffening element.

Advantageously, the at least one connection means comprises multiple bearing locations, which are arranged flush with one another at least for a portion in parallel with the transverse axis of the coupling plate. In this embodiment, multiple bearing locations are distributed and spaced apart in the direction of the transverse axis, against which an installed stiffening element is braced. The distribution of multiple bearing locations in the direction of the transverse axis further contributes to a weight reduction of the coupling plate, since no continuous and thus long bearing location in the transverse direction is required. Furthermore, the installing and removal of the at least one stiffening element is easier to perform, since less contact area and thus less force is needed to overcome the friction and any contact corrosion.

Advantageously, the at least one connection means comprises a first connection means which is arranged in the direction of the longitudinal axis on a side of the transverse axis facing away from the entrance opening. The first connection means and thus also any first stiffening element installed therein should be situated in the longitudinal axis of the coupling plate as close as possible to the receiving structures of the bearing blocks, since the bending moment acting on the coupling plate is the greatest there. In the area of the entrance opening and immediately in the area of the transverse axis, that is, in the kingpin bearing region, it is more complicated in terms of design to mount a connection means on the coupling plate, since the kingpin here moves into and out from the fifth wheel coupling when coupling and decoupling the semitrailer and sometimes the bottom side of the coupling plate is protruding downwards. Hence, the danger of a collision between the kingpin and the stiffening element would exist for a stiffening element installed in the connection means. Furthermore, the available free space on the bottom side of the coupling plate is extremely limited on account of the locking mechanism which is likewise accommodated there.

Instead of or in addition to the above described embodiment with the first connection means, the at least one connection means may comprise a second connection means, which is arranged in the direction of the longitudinal axis on a side of the transverse axis facing toward the entrance opening below a vertical level of a kingpin introduced into the coupling plate. The second connection means might be used in vehicle types for which the installation situation does not allow the installing of a first stiffening element in the corresponding first connection means, although an installing of the second stiffening element in the second connection means is possible. The second connection means can moreover be used in order to still further increase the stiffness in the transverse axis and to outfit both the first connection means and the second connection means with corresponding stiffening elements. The position of the second connection means is especially favorable since there is also a further stiffening of the coupling plate as close as possible to the transverse axis and thus in the areas of the largest anticipated forces.

Instead of or in addition to the above described embodiment with the first and/or second connection means, the at least one connection means may comprise a third connection means, which is arranged in the direction of the longitudinal axis on a side of the transverse axis facing toward or away from the entrance opening. In this case, yet another, third connection means is situated preferably on the same side of the transverse axis as the first or second connection means, which can be outfitted with an additional, third stiffening element for example when there are especially high demands on the bending stiffness of the coupling plate. Advisedly, the third connection means is arranged underneath or offset from the first and/or second connection means parallel to the longitudinal axis.

It has proven to be advisable for a rib structure to be formed on the bottom side of the coupling plate. By a rib structure is meant single-piece walls engaging integrally with the bottom side of the coupling plate, being oriented substantially perpendicular to the bottom side of the coupling plate. The rib structure likewise serves for stiffening the coupling plate. This can be accomplished especially effectively when the respective walls are joined together.

Advantageously, the at least one connection means is an integral part of the rib structure. The at least one connection means in particular may be formed from an opening or bore introduced in the rib structure or on a bulge formed on one of the ribs at rights angles to its extension in the form of a horizontal wall extension, which runs parallel to the plane of the coupling plate. The benefit of this configuration is that no additional components need to be formed on the coupling plate.

The rib structure may comprise lengthwise ribs running parallel to the longitudinal axis and transverse ribs running parallel to the transverse axis. Thus, the lengthwise and transverse ribs are substantially perpendicular to each other and form a cohesive truss for the effective transmission of force.

Advisedly, the at least one connection means comprises two outer bearing locations with a respective outer bearing opening running parallel to the transverse axis. The outer bearing locations may be situated in the direction of the longitudinal axis of the coupling plate before the receiving structure for the bearing block situated on the same side of the coupling plate.

It is especially preferred for the outer bearing locations to be arranged in the lengthwise ribs. The lengthwise ribs in particular may be an extension of receiving structures of the bearing blocks.

Preferably, the outer bearing openings are closed or closable in the circumferential direction. This prevents a loss of the stiffening element in its radial direction.

According to an especially advantageous embodiment, the at least one connection means comprises a central bearing location with a central bearing opening running parallel to the transverse axis. The central bearing location with its central bearing opening may occupy approximately the entire width of the coupling plate in the direction of the transverse axis, so that on further outer bearing locations are necessary. However, it is also possible for the central bearing location to be provided in a middle segment in proximity to the longitudinal axis and to arrange the outer bearing locations at a distance from this. Advisedly, the central bearing location is arranged between the outer bearing locations. In this case, a stiffening element installed in the at least one connection means is braced with three points against the bottom side of the coupling plate.

The central bearing opening may be partly open in the circumferential direction or it may be closable by means of a closure means. If a loss protection for the stiffening element is already present by appropriately shaped outer bearing locations, the central bearing opening may be partly open in a direction parallel to the planar bearing surface of the coupling plate. It is then enough for a stiffening element installed in the central bearing opening to find an abutment beneath it in the installation position of the coupling plate.

If the outer bearing locations do not provide a loss protection for the stiffening element, it is advisable for a central bearing opening which is otherwise partly open in the circumferential direction to be closed or narrowed at least in part by a closure means, such as an inserted bolt, in order to prevent a stiffening element from working itself out in its radial direction.

The central bearing location may be formed on one of the transverse ribs. It is especially advantageous for the transverse rib together with an adjoining horizontal wall extension to have an L-shape and for the horizontal wall extension, which is oriented parallel to the planar bearing surface of the coupling plate, to present an abutment for a stiffening element under bending strain of the coupling plate.

The invention is likewise realized in a combination of the coupling plate with at least one stiffening element, wherein the at least one stiffening element is held releasably by the at least one connection means of the coupling plate. A releasable mounting enables the complete removal of the at least one stiffening element in loading scenarios in which no increased strength is required for the coupling plate. The at least one stiffening element is held in such a way by the corresponding at least one connection means that lift forces acting upward in the installation position of the coupling plate are absorbed by the at least one stiffening element.

Advantageously, the at least one stiffening element is a rod. By a rod is meant a narrow, long, usually massive object with usually round or approximately square cross section. A rod is the most simple supporting member in a supporting structure such as a truss or a frame. By contrast with a beam, a rod is very thin as compared to its length. The rod axis represents the gravity axis of a component. It can transmit normal forces. A rod can be loaded at any point.

According to one favorable modification of the invention, the at least one stiffening element comprises a first stiffening element, which is held by the first connection means.

Instead of or in addition to the above described embodiment with the first stiffening element, the at least one stiffening element may comprise a second stiffening element, which is held by the second connection means. The second stiffening element can be used in addition to the first stiffening element in order to further increase the bending strength in the transverse axis. An alternative installation in place of the first stiffening element may be considered for example when the preconditions on the vehicle side are not present for the installation of the first stiffening element.

Preferably, the second stiffening element is situated below a vertical level of a kingpin introduced into the coupling plate. In this way, a collision between the kingpin introduced into the coupling plate and the stiffening element is avoided when coupling and decoupling a semitrailer.

Instead of or in addition to the above described embodiment with the first and/or second stiffening element, the at least one stiffening element may comprise a corresponding, third stiffening element, which is held by the third connection means. Advisedly, the third stiffening element is arranged beneath or offset from the first and/or second stiffening element and parallel in the longitudinal axis.

Especially preferred is an embodiment in which the at least one stiffening element has a different spring characteristic than the coupling plate. For this, the at least one stiffening element can advisedly be made from a different material than the coupling plate, especially from a carbon-containing material.

Most especially preferred is an embodiment in which the at least one stiffening element has a different spring characteristic which prevents a plastic deformation of the coupling plate before reaching a given loading target value.

The at least one stiffening element and the at least one connection means may preferably be designed as floating bearings. In this way, in particular, undesirable stresses due to the different materials of the at least one stiffening element and the corresponding at least one connection means and/or the coupling plate are reduced. Furthermore, the installing and removal of the at least one stiffening element is significantly simplified, since this is mounted at first without any external force application on the coupling plate and having play in the at least one connection means. Under external force application, the coupling plate begins to deform at first, using up the play between the at least one connection means and the at least one stiffening element held therein and the at least one stiffening element is subsequently involved in the force transmission. The action of the at least one stiffening element consequently comes to bear before the coupling plate begins to deform elastically. When selecting the spring characteristics for the coupling plate and the at least one stiffening element and in the mounting with play between the at least one connection means and the corresponding at least one stiffening element, one should make sure that the deformation of the coupling plate always occurs in a reversible region before reaching the yield limit. The same holds for the at least one stiffening element.

It may also be advisable to provide an elastic damping element between the at least one stiffening element and the bearing location/bearing locations, especially the outer and/or central bearing location, which on the one hand enables an easier installing and removal of the at least one stiffening element and on the other hand a slower build-up of force inside the at least one stiffening element.

BRIEF DESCRIPTION OF THE DRAWINGS

For better comprehension, the invention shall now be explained more closely with the aid of nine figures. There are shown.

DETAILED DESCRIPTION OF THE INVENTION

Figure 1:
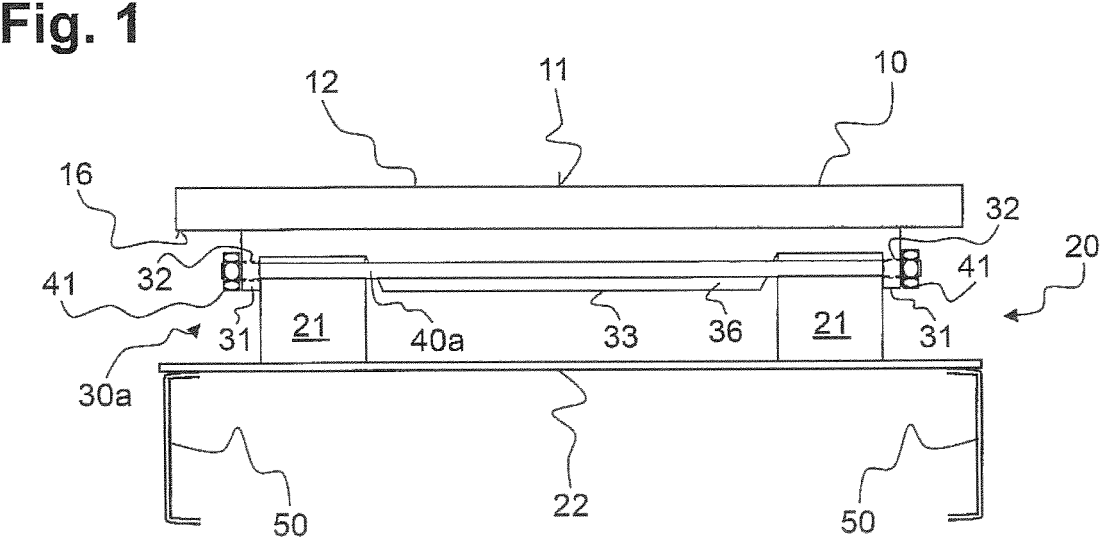
FIG. 1: a front view of a fifth wheel coupling with coupling plate and first connection means as well as a first stiffening element installed therein according to a first embodiment.

FIG. 1 shows in a front view a coupling plate 10 of a fifth wheel coupling 20 in the mounted state on a vehicle frame 50 of a tractor vehicle not further shown. The fifth wheel coupling 20 comprises for this purpose two bearing blocks 21 spaced apart laterally, which contact complementary designed receiving structures 17 (see FIG. 2) of the coupling plate 10 at their upper end and transmit the loads acting thereupon to the vehicle frame 50.

In the exemplary embodiment shown in FIG. 1, the bearing blocks 21 stand by their lower end on a mounting plate 22, which is placed on the vehicle frame 50 from above and connected to it. In the case of a narrower vehicle frame 50, it is also possible to secure the bearing blocks 21 directly or via an auxiliary frame to the vehicle frame 50. The bearing blocks 21 enable a tilting movement about a transverse axis y, indicated in FIG. 2, which enables a relative movement between the tractor vehicle and the semitrailer, especially when driving over peaks and valleys.

Figure 6:
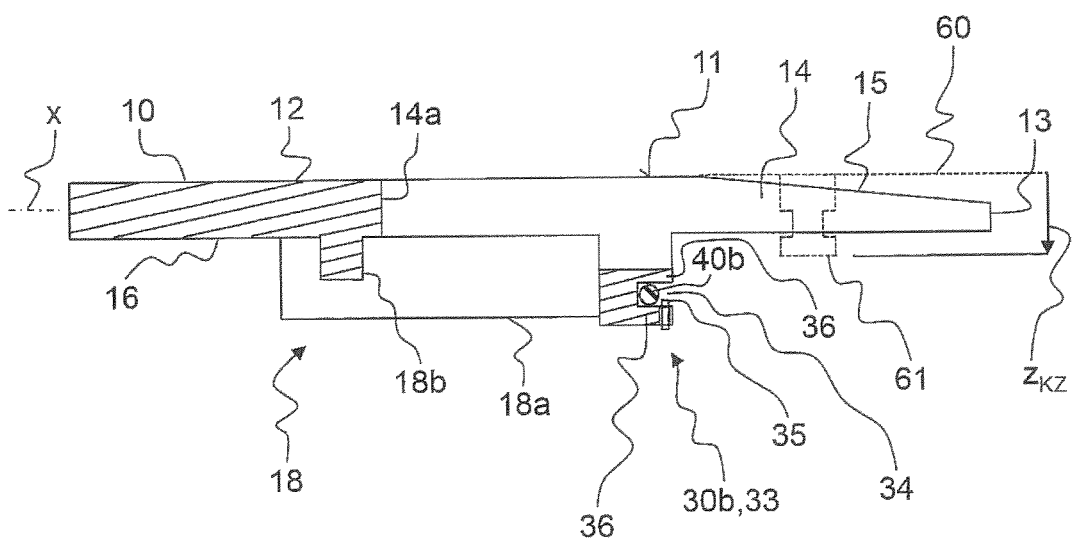
FIG. 6: a longitudinal section through the coupling plate with second connection means and second stiffening element installed therein.

The coupling plate 10 is configured with a planar bearing surface 12 on its top side 11, on which a semitrailer once attached is braced with a skid plate 60 (see FIG. 6). In the present exemplary embodiment, the top side 11 is continuous in configuration, but it may also consist of multiple plate-like partial surfaces, which then form a planar bearing surface 12 with each other.

Figure 2:
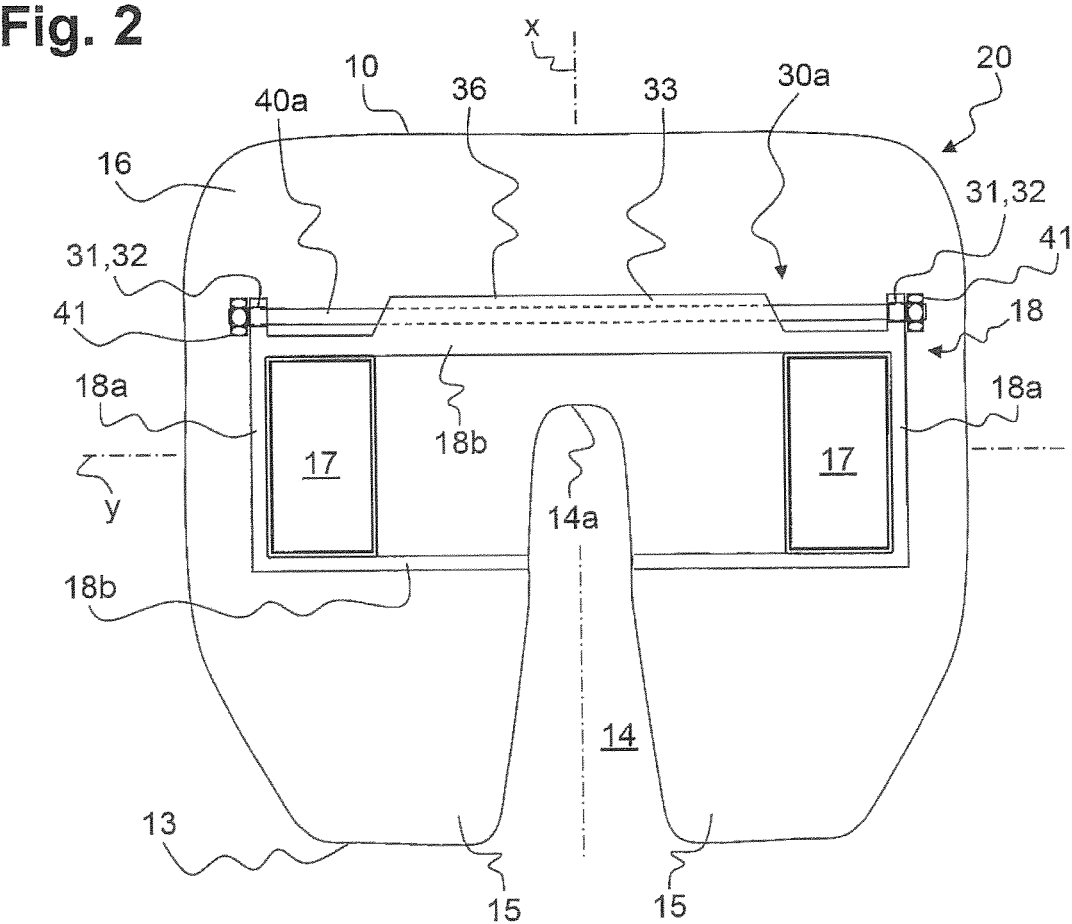
FIG. 2: a bottom view of the coupling plate of FIG. 1.

As can be seen especially well in the bottom view of FIG. 2, the coupling plate 10 has at its rear end 13 an entrance opening 14, which extends in a longitudinal axis x and ends in a kingpin bearing region 14a approximately in the area of the transverse axis y. The entrance opening 14 serves for the lateral guiding of a kingpin 61 of a semitrailer, not shown here (see FIG. 6), during the coupling and uncoupling process until it is in its locked position. The entrance opening 14 for an easier docking of the kingpin 61 has a conically broadened segment in the direction of the rear end 13, which is flanked on both sides by entrance horns 15. The entrance horns 15 according to the side view of FIG. 3 drop off in the direction of the rear end 13 and thereby form a ramp for the skid plate 60 of a semitrailer prior to its coupling, which is raised in the direction of the planar bearing surface 13 especially in the case of a low positioned starting position.

The receiving structures 17 for the fastening of the bearing blocks 21 on the coupling plate 10 are joined together by a rib structure 18 formed on a bottom side 16. The rib structure 18 has lengthwise ribs 18a running parallel to the longitudinal axis x and transverse ribs 18b running parallel to the transverse axis y. Insofar as two transverse ribs 18b are present, as shown, these should be arranged on either side of the kingpin bearing region 14a, in order to absorb as effectively as possible the lift forces introduced by the kingpin 61 into the coupling plate 10. Both transverse ribs 18b are joined together via the two lengthwise ribs 18a into a completely closed box in the present case, but it may also be partly closed.

In order to further stiffen the coupling plate 10, a first connection means 30a is arranged on the rib structure 18, with whose aid an additional first stiffening element 40a can be fastened on the coupling plate 10. The first connection means 30a allows a releasable mounting of the first stiffening element 40a offset parallel to the transverse axis y of the coupling plate 10, by which in particular a lifting of lateral regions and a consequent deforming of the coupling plate 10 in the transverse axis y under heavy loading is avoided or at least reduced.

The first stiffening element 40a according to the embodiments shown in the figures is a rod with round circular cross section. In theory, however, other profile shapes and cross sections are possible; thus, the first stiffening element 40a may have a greater wall thickness or a thickened diameter in areas with heavy force application.

Figure 3:
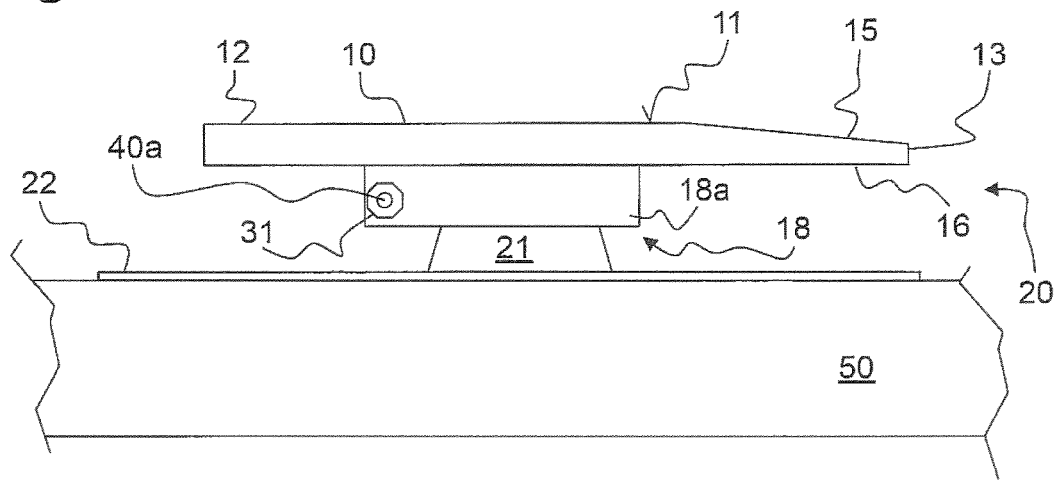
FIG. 3: a side view of the coupling plate of FIG. 1.

The first connection means 30a in the embodiment of FIGS. 1 to 3 comprises outer bearing locations 31 situated on opposite sides and a central bearing location 33 positioned between the outer bearing locations 31. The outer bearing locations 31 are respectively arranged in one of the lengthwise ribs 18a and each of them has an outer bearing opening 32, which are oriented parallel to the transverse axis y and are aligned with each other. The outer bearing openings 32 are boreholes passing entirely through the lengthwise ribs 18a in their axial extension. Because of the outer bearing openings 32 being completely closed in the circumferential direction, a loss of the first stiffening element 40a in the radial direction is precluded.

For the mounting of the first stiffening element 40a, this has been through both outer bearing openings 32 from one side of the coupling plate 10 and captively secured. The captive securement comprises loss protection caps 41 screwed onto both ends of the first stiffening element 40a, preventing a wandering of the first stiffening element 40a in the axial direction. The loss protection caps 41 are secured to the first stiffening element 40a in such a way that it is movable in the axial direction and thus makes possible a largely stress-free mounting of the first stiffening element 40a despite different expansion coefficients of coupling plate 10 and first stiffening element 40a in the load-free state.

The first stiffening element 40a in the loaded state is additionally braced against the central bearing location 33 between the outer bearing locations 31. The central bearing location 33 is formed substantially by a horizontal wall extension 36, which is formed on the transverse rib 18b and together with it forms an L-shape.

In the installed position, the horizontal wall extension 36 engages behind the first stiffening element 40a extending between the outer bearing locations 31 from below. If one side of the coupling plate 10 is lifted up, the first stiffening element 40a also begins to deform plastically on account of the bending strain of the coupling plate 10 in the transverse axis y until it comes to bear against the horizontal wall extension 36 of the transverse rib 18b. The formation of the horizontal wall extension 36 on the transverse rib 18b and a resulting central bearing opening 34 to receive the first stiffening element 40a is especially evident in the longitudinal section view of FIG. 5. The central bearing opening 34 according to the first embodiment is aligned with the outer bearing openings 32 on both sides.

Figure 4:
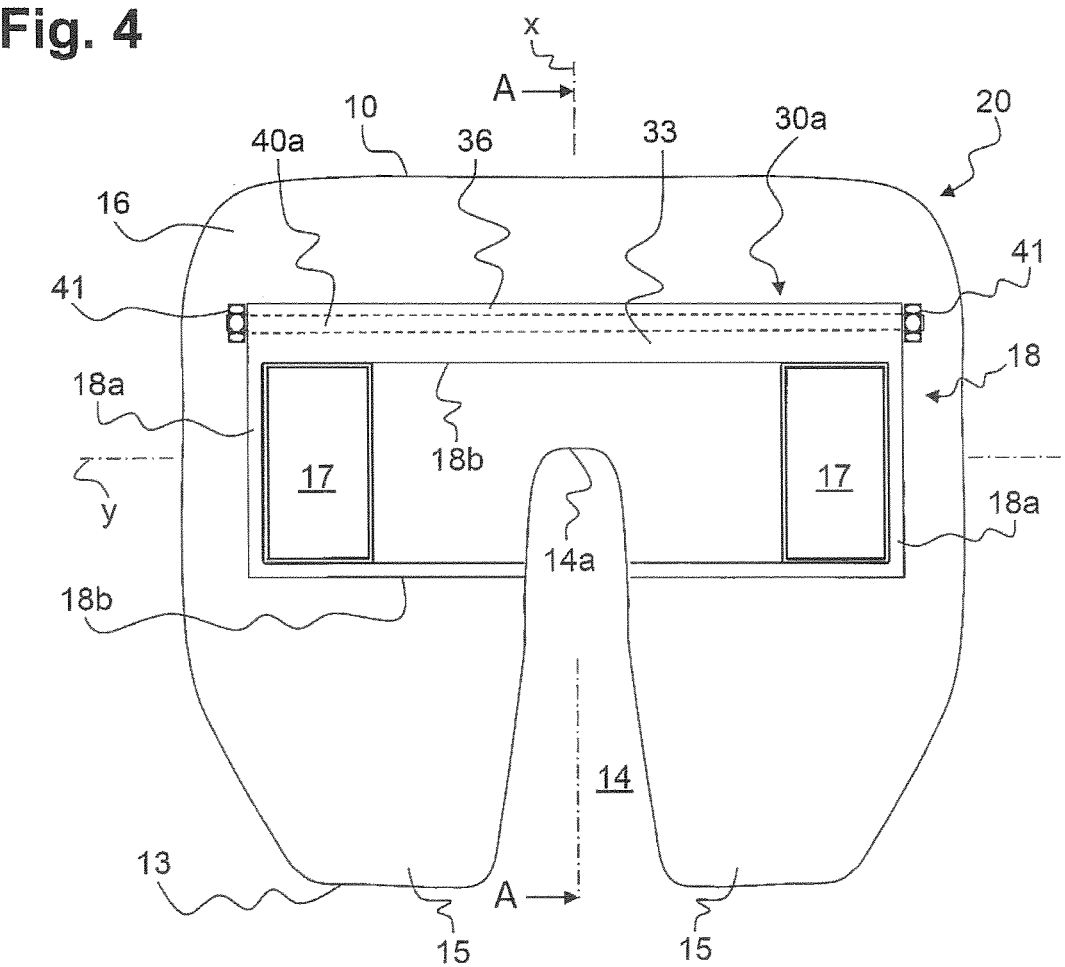
FIG. 4: a bottom view of a coupling plate with first connection means as well as a first stiffening element installed therein according to a second embodiment.
Figure 5:
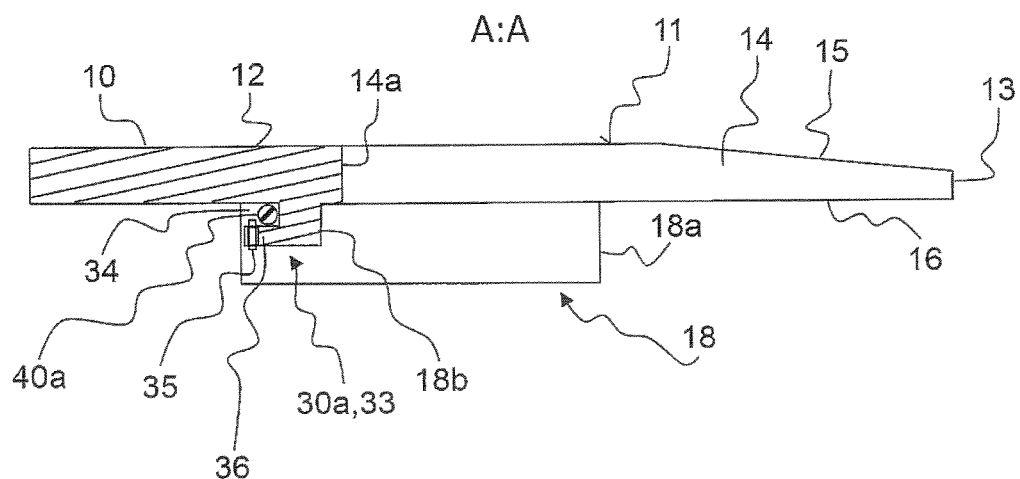
FIG. 5: a longitudinal section in the sectioning plane A:A of FIG. 4.

FIG. 4 and FIG. 5 show a second embodiment of the invention, in which the outer bearing locations 31 have been omitted and the first stiffening element 40a is held solely by the central bearing location 33. The central bearing location 33 for this purpose extends in the direction of the transverse axis y approximately over the entire width of the transverse rib 18b, which for this purpose likewise has a horizontal wall extension 36, per FIG. 5, against which the first stiffening element 40a lies.

Due to the lack of outer bearing locations 31, which bring about a fixation of the first stiffening element 40a in its radial direction by means of their outer bearing openings 32 which are closed in the circumferential direction, the first stiffening element 40a here is protected by closure means 35 against loss in the radial direction. The closure means 35 ensures a narrowing of the central bearing opening 34, so that the first stiffening element 40a can no longer pass in the radial direction through the central bearing opening 34 otherwise open at one end. The closure means 35 may be formed, for example, of multiple screw bolts, arranged offset from each other, which are led through corresponding bores in the horizontal wall extension 36 and protrude into the central bearing opening 34.

For an application with low anticipated operating loads, the coupling plate 10 may also be configured without the first stiffening element 40a, yet still with the first connection means 30a provided for this.

The longitudinal section of FIG. 6 shows an alternative installation position for a second connection means 30b and a second stiffening element 40b interacting with it, being arranged not like the first connection means 30a and first stiffening element 40a in the longitudinal axis x on the side of the kingpin bearing region 14a facing away from the rear end 13, but instead on the side of the kingpin bearing region 14a facing toward the rear end 13 in the longitudinal direction x or the transverse axis y. The transverse rib 18b located there is situated beneath the entrance opening 14 below a vertical level $z_{KZ}$ of the kingpin 61, whose position during the coupling process is indicated together with the skid plate 60, and therefore it cannot collide with the kingpin

61. In the axial extension, a groove-like central bearing opening 34 runs through the transverse rib 18b beneath the vertical level $z_{KZ}$, being bounded on top and bottom by a horizontal wall extension 36. The second stiffening element 40b is installed in the central bearing opening 34 and helps increase the bending stiffness of the coupling plate 10.

For an application with low anticipated operating loads, the coupling plate 10 may also be configured without the second stiffening element 40b, yet still with the second connection means 30b provided for this.

The described exemplary embodiments of FIG. 1 to FIG. 6 enable a variability in terms of increasing the bending stiffness by installing or omitting a first or second stiffening element 40a, 40b in a corresponding first or second connection means 30a, 30b. The exemplary embodiments of FIG. 7 and FIG. 8 increase the range of loading capacity in that two of the connection means 30a, 30b, 30c are present on the coupling plate 10, in which by choice none, one, or two of the stiffening elements 40, 40b, 40c are introduced.

Figure 7:
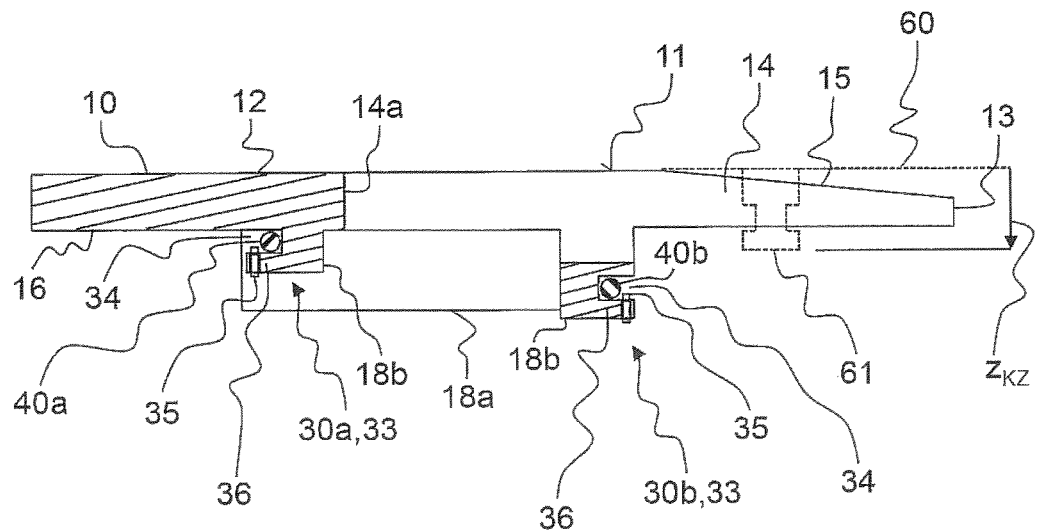
FIG. 7: a longitudinal section through the coupling plate with first and second connection means and first and second stiffening element installed therein.

In the representation of FIG. 7, a first connection means 30a in the form of a central bearing location 33 is configured on the transverse rib 18b distant from the rear end 13 and in addition a second connection means 30b is configured on the transverse rib 18b near the rear end 13. The respective central bearing openings 34 are facing away from each other and respectively point away from the rib structure 18, enabling an easier outfitting of the connection means 30a, 30b with corresponding stiffening elements 40a, 40b.

Figure 8:
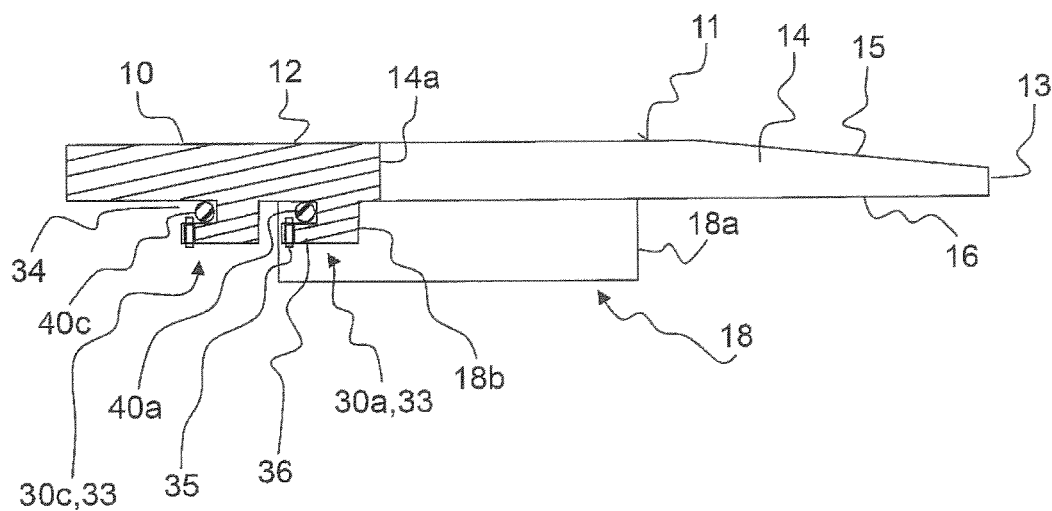
FIG. 8: a longitudinal section through the coupling plate with first and third connection means and first and third stiffening element installed therein

According to the embodiment represented in FIG. 8, two parallel oriented connection means 30a, 30c can be seen, which may be provided with corresponding stiffening elements 40a, 40c as shown and thereby accomplish a maximum stiffening of the coupling plate 10. The connection means 30a, 30c are oriented at a height level offset parallel to the planar bearing surface 12. By choice, both stiffening elements 40a, 40c may be removed from the connection means 30a, 30c, or only a single stiffening element 40a, 40c may be removed from one of the connection means 30a, 30c. The connection means 30a, 30c then remain without a stiffening element 40a, 40c on the coupling plate.

Figure 9:
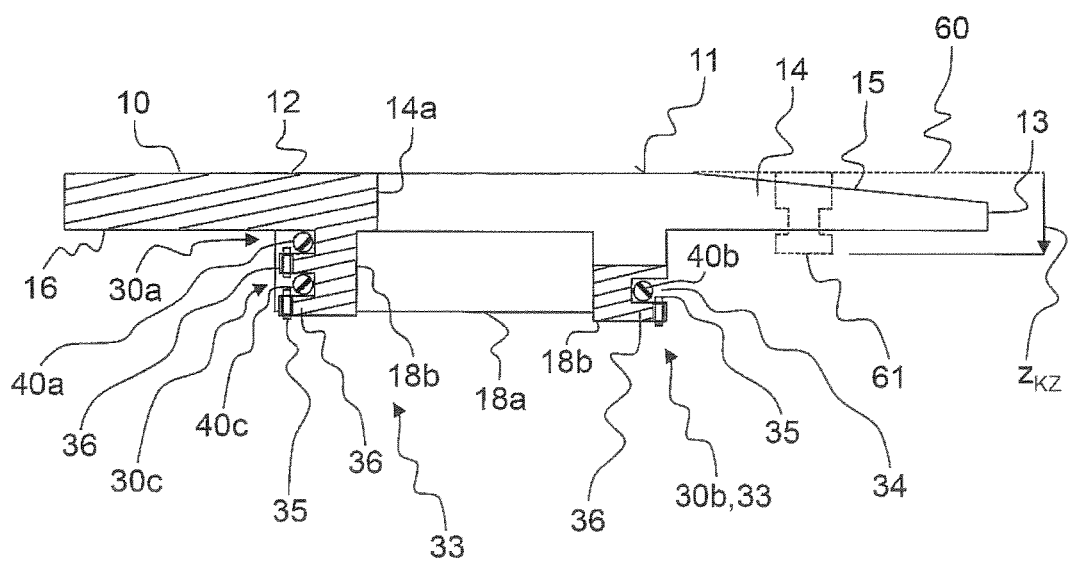
FIG. 9: a longitudinal section through the coupling plate with first, second and third connection means and first, second and third stiffening element installed therein.

FIG. 9 shows a further embodiment with a total of three connection means 30a, 30b, 30c, of which a first and third connection means 30a, 30c are arranged one above the other in the same transverse rib 18b. The transverse rib 18b is the transverse rib 18b away from the rear end 13. In the transverse rib 18b close to the rear end 13, only the second connection means 30b is formed. Owing to the greater vertical distance from the planar bearing surface 12 than the level $z_{KZ}$ of the kingpin 61, there is likely insufficient room for yet another connection means mounted underneath, due to the swivel movement of the coupling plate 10 during driving operation.

Depending on the anticipated loading of the coupling plate 10, all, some or none of the connection means 30a, 30b, 30c may be outfitted with stiffening elements 40a, 40b, 40c. Accordingly, the embodiment of FIG. 9 allows a maximum variability in terms of adaptability to anticipated loading scenarios.

LIST OF REFERENCE NUMBERS

10 Coupling plate
11 Top side
12 Planar bearing surface
13 Rear end
14 Entrance opening
14a Kingpin bearing region
15 Entrance horns
16 Bottom side
17 Receiving structure
18 Rib structure
18a Lengthwise ribs
18b Transverse ribs
20 Fifth wheel coupling
21 Bearing block
22 Mounting plate
30a First connection means
30b Second connection means
30c Third connection means
31 Outer bearing location
32 Outer bearing opening
33 Central bearing location
34 Central bearing opening
35 Closure means
36 Horizontal wall extension
40a First stiffening element
40b Second stiffening element
40c Third stiffening element
41 Loss protection caps
50 Vehicle frame
60 Skid plate
61 Kingpin
x Longitudinal axis
Y Transverse axis
$z_{KZ}$ Kingpin level

What is claimed is:

1. A coupling plate for a fifth wheel coupling, wherein the coupling plate on a top side comprises a planar bearing surface and at a rear end comprises two entrance horns bordering on an entrance opening, the entrance opening extends in a longitudinal axis (x) of the coupling plate and ends in a kingpin bearing region, and the coupling plate is configured with a respective receiving structure for a bearing block on a bottom side, on either side of the kingpin bearing region and spaced apart from each other on a transverse axis (y),
    wherein the transverse axis (y) is the axis about which the coupling plate tilts relative to the bearing blocks,
    wherein, in addition to the receiving structures provided on the coupling plate, at least one connection means for the releasable mounting of at least one stiffening element is also provided on the coupling plate, beneath the planar bearing surface, and
    wherein the at least one connection means comprises a) a first connection means which is arranged in the direction of the longitudinal axis (x) on a side of and offset from the transverse axis (y) facing away from the entrance opening and/or b) the at least one connection means comprises a second connection means, which is arranged in the direction of the longitudinal axis (x) on a side of and offset from the transverse axis (y) facing toward the entrance opening below a vertical level ($Z_{KZ}$) of a kingpin introduced into the coupling plate.

2. The coupling plate according to claim 1, wherein the at least one connection means comprises multiple bearing locations, which are arranged flush with one another at least for a portion in parallel with the transverse axis (y) of the coupling plate.

3. The coupling plate according to claim 1, wherein the at least one connection means comprises a third connection means, which is arranged in the direction of the longitudinal axis (x) on a side of the transverse axis (y) facing toward or away from the entrance opening.

4. The coupling plate according to claim 1, wherein a rib structure is formed on the bottom side of the coupling plate.

5. The coupling plate according to claim 4, wherein the at least one connection means is an integral part of the rib structure.

6. The coupling plate according to claim 4, wherein the rib structure comprises lengthwise ribs running parallel to the longitudinal axis (x) and transverse ribs running parallel to the transverse axis (y).

7. The coupling plate according to claim 6, wherein the at least one connection means comprises two outer bearing locations with a respective outer bearing opening running parallel to the transverse axis (y).

8. The coupling plate according to claim 7, wherein the outer bearing locations are situated in the lengthwise ribs.

9. The coupling plate according to claim 8, wherein the at least one connection means comprises a central bearing location with a central bearing opening running parallel to the transverse axis (y).

10. The coupling plate according to claim 9, wherein the central bearing location is formed on one of the transverse ribs.

11. A combination of a coupling plate according to claim 1 with at least one stiffening element, wherein the at least one stiffening element is held releasably by the at least one connection means of the coupling plate.

12. The combination according to claim 11, wherein the at least one stiffening element comprises a first stiffening element, which is held by a first connection means.

13. The combination according to claim 11, wherein the at least one stiffening element comprises a second stiffening element, which is held by a second connection means.

14. The combination according to claim 13, wherein the second stiffening element is situated below a vertical level ($z_{KZ}$) of a kingpin introduced into the coupling plate.

15. The combination according to claim 11, wherein the at least one stiffening element comprises a third stiffening element, which is held by a third connection means.

16. The combination according to claim 11, wherein the at least one stiffening element has a different spring characteristic than the coupling plate.

17. The combination according to claim 11, wherein the at least one stiffening element is made from a carbon material.

18. The combination according to claim 11, wherein the at least one stiffening element and the at least one connection means are designed as floating bearings.

* * * * *